United States Patent
Chen et al.

(10) Patent No.: US 8,896,955 B1
(45) Date of Patent: Nov. 25, 2014

(54) ADAPTIVE TRACK FOLLOW CONTROL

(75) Inventors: Min Chen, San Leandro, CA (US);
Alain Chahwan, Mission Viejo, CA (US); Shang-Chen Wu, Milpitas, CA (US); Qixing Zheng, Albany, CA (US); Alexander Babinski, Laguna Niguel, CA (US); Duc T. Phan, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 832 days.

(21) Appl. No.: 13/162,095

(22) Filed: Jun. 16, 2011

Related U.S. Application Data

(60) Provisional application No. 61/378,583, filed on Aug. 31, 2010.

(51) Int. Cl.
*G11B 5/596* (2006.01)

(52) U.S. Cl.
CPC ........ *G11B 5/59622* (2013.01); *G11B 5/59694* (2013.01)
USPC ............................ 360/55; 360/75; 360/77.04

(58) Field of Classification Search
None
See application file for complete search history.

(56) References Cited

U.S. PATENT DOCUMENTS

| | | | |
|---|---|---|---|
| 5,299,075 A | 3/1994 | Hanks | |
| 5,333,138 A | 7/1994 | Richards et al. | |
| 5,654,840 A | 8/1997 | Patton et al. | |
| 5,663,847 A | 9/1997 | Abramovitch | |
| 5,923,487 A | 7/1999 | Carlson et al. | |
| 6,115,200 A | 9/2000 | Allen et al. | |
| 6,414,813 B2 | 7/2002 | Cvancara | |
| 6,429,990 B2 | 8/2002 | Serrano et al. | |
| 6,538,839 B1 | 3/2003 | Ryan | |
| 6,564,110 B1 * | 5/2003 | Makino et al. | ............. 360/77.04 |
| 6,614,618 B1 | 9/2003 | Sheh et al. | |
| 6,636,377 B1 | 10/2003 | Yu et al. | |
| 6,674,600 B1 | 1/2004 | Codilian et al. | |
| 6,710,966 B1 | 3/2004 | Codilian et al. | |
| 6,754,021 B2 | 6/2004 | Kisaka et al. | |
| 6,795,262 B1 | 9/2004 | Codilian et al. | |
| 6,853,512 B2 | 2/2005 | Ozawa | |

(Continued)

FOREIGN PATENT DOCUMENTS

JP 2001-266466 9/2001

OTHER PUBLICATIONS

L. Hakansson, "The Filtered-x LMS Algorithm", Department of Telecommunications and Signal Processing, University of Karlskrona/Ronneby, 372 25 Ronneby, Sweden.

*Primary Examiner* — Wayne Young
*Assistant Examiner* — James L Habermehl

(57) ABSTRACT

A disk drive comprises a track follow control system having a plurality of selectable frequency modes, the track follow control system configured to receive a position error signal and to output a control signal based on the position error signal, wherein the control signal is used by a head assembly to position a head over a disk. The disk drive also comprises a state estimator configured to receive the control signal and a position signal indicating a position of the head, to estimate a disturbance based on the control signal and the position signal, and to output an estimated disturbance signal based on the estimated disturbance. The disk drive further comprises a disturbance evaluator configured to receive the estimated disturbance signal, and to select one of the frequency modes of the track follow control system based on the estimated disturbance signal.

23 Claims, 9 Drawing Sheets

(56) References Cited

U.S. PATENT DOCUMENTS

| | | | |
|---|---|---|---|
| 6,900,958 B1 | 5/2005 | Yi et al. | |
| 6,909,574 B2 | 6/2005 | Aikawa et al. | |
| 6,914,743 B1 | 7/2005 | Narayana et al. | |
| 6,922,304 B2 * | 7/2005 | Nakagawa | 360/77.04 |
| 6,950,271 B2 | 9/2005 | Inaji et al. | |
| 6,952,318 B1 | 10/2005 | Ngo | |
| 6,958,882 B2 | 10/2005 | Kisaka | |
| 6,967,804 B1 | 11/2005 | Codilian | |
| 7,116,611 B2 * | 10/2006 | Yokoyama | 369/44.35 |
| 7,139,401 B2 | 11/2006 | Culman et al. | |
| 7,142,385 B2 | 11/2006 | Shimotono et al. | |
| 7,154,690 B1 | 12/2006 | Brunnett et al. | |
| 7,199,964 B2 * | 4/2007 | Liu et al. | 360/75 |
| 7,203,028 B2 * | 4/2007 | Chung et al. | 360/78.09 |
| 7,265,934 B2 * | 9/2007 | Takaishi | 360/77.04 |
| 7,292,403 B2 * | 11/2007 | Baek et al. | 360/77.02 |
| 7,315,433 B2 * | 1/2008 | Baek et al. | 360/77.02 |
| 7,319,570 B2 * | 1/2008 | Jia et al. | 360/77.02 |
| 7,330,332 B2 * | 2/2008 | Baek et al. | 360/77.04 |
| 7,372,659 B2 * | 5/2008 | Takaishi | 360/77.04 |
| 7,382,563 B2 | 6/2008 | Saitoh et al. | |
| 7,423,833 B1 | 9/2008 | Sutardja | |
| 7,466,101 B2 * | 12/2008 | Takaishi | 360/77.02 |
| 7,471,483 B1 | 12/2008 | Ferris et al. | |
| 7,504,795 B2 * | 3/2009 | Takaishi | 360/77.04 |
| 7,535,192 B2 * | 5/2009 | Takaishi | 360/77.04 |
| 7,561,365 B2 | 7/2009 | Noguchi et al. | |
| 7,595,953 B1 | 9/2009 | Cerda et al. | |
| 7,596,795 B2 | 9/2009 | Ding et al. | |
| 7,633,704 B2 | 12/2009 | Supino et al. | |
| 7,852,588 B1 | 12/2010 | Ferris et al. | |
| 8,179,626 B1 | 5/2012 | Ryan et al. | |
| 8,180,464 B2 * | 5/2012 | Gao et al. | 700/44 |
| 8,644,963 B2 * | 2/2014 | Gao et al. | 700/44 |
| 2002/0153451 A1 | 10/2002 | Kiss et al. | |
| 2003/0123182 A1 | 7/2003 | Inaji et al. | |
| 2004/0080860 A1 | 4/2004 | Inaji et al. | |
| 2004/0240101 A1 | 12/2004 | Inaji et al. | |
| 2005/0088774 A1 | 4/2005 | Bahirat et al. | |
| 2006/0291087 A1 | 12/2006 | Suh et al. | |
| 2006/0291101 A1 | 12/2006 | Takaishi | |
| 2008/0065240 A1 * | 3/2008 | Takaishi | 700/37 |
| 2008/0174900 A1 | 7/2008 | Abrishamchian et al. | |
| 2009/0034116 A1 | 2/2009 | Higashino et al. | |
| 2009/0034117 A1 | 2/2009 | Higashino | |
| 2009/0135516 A1 | 5/2009 | Takasaki et al. | |
| 2010/0061007 A1 | 3/2010 | Matsushita et al. | |
| 2010/0079906 A1 | 4/2010 | Wile et al. | |
| 2012/0050904 A1 | 3/2012 | Park et al. | |
| 2014/0195013 A1 * | 7/2014 | Gao et al. | 700/45 |

* cited by examiner

ADAPTIVE TRACK FOLLOW CONTROL

CROSS-REFERENCE TO RELATED APPLICATIONS

The present application claims priority from provisional U.S. Patent Application Ser. No. 61/378,583, filed on Aug. 31, 2010, the specification of which is incorporated herein by reference.

BACKGROUND

A disk drive comprises a rotating disk and a head over the disk to magnetically write to and read data from the disk. The head may be connected to a distal end of an actuator arm that is rotated about a pivot to position the head radially over the disk. The disk may comprise a plurality of radially spaced, concentric tracks for recording data and servo information on the disk. The servo information may be read by the head to generate a position error signal (PES) indicating the deviation of the head position from a desired track. The PES may be fed to a track follow controller that adjusts the head position in a direction that reduces the PES to keep the head on the desired track.

Disturbances, such as vibrations, are becoming an increasing problem for disk drives. As the data area density of the disk continues to increase, the tracks per inch (TPI) becomes higher, making it more difficult for the track follow controller to keep the head on track under disturbance conditions. Also, in many mobile devices, the disk drive is mounted near speakers, which generate audio vibrations that can propagate to the disk drive and impact disk performance.

Accordingly, there is a need for adaptive track follow control that is able to provide good track follow performance under different disturbance conditions.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
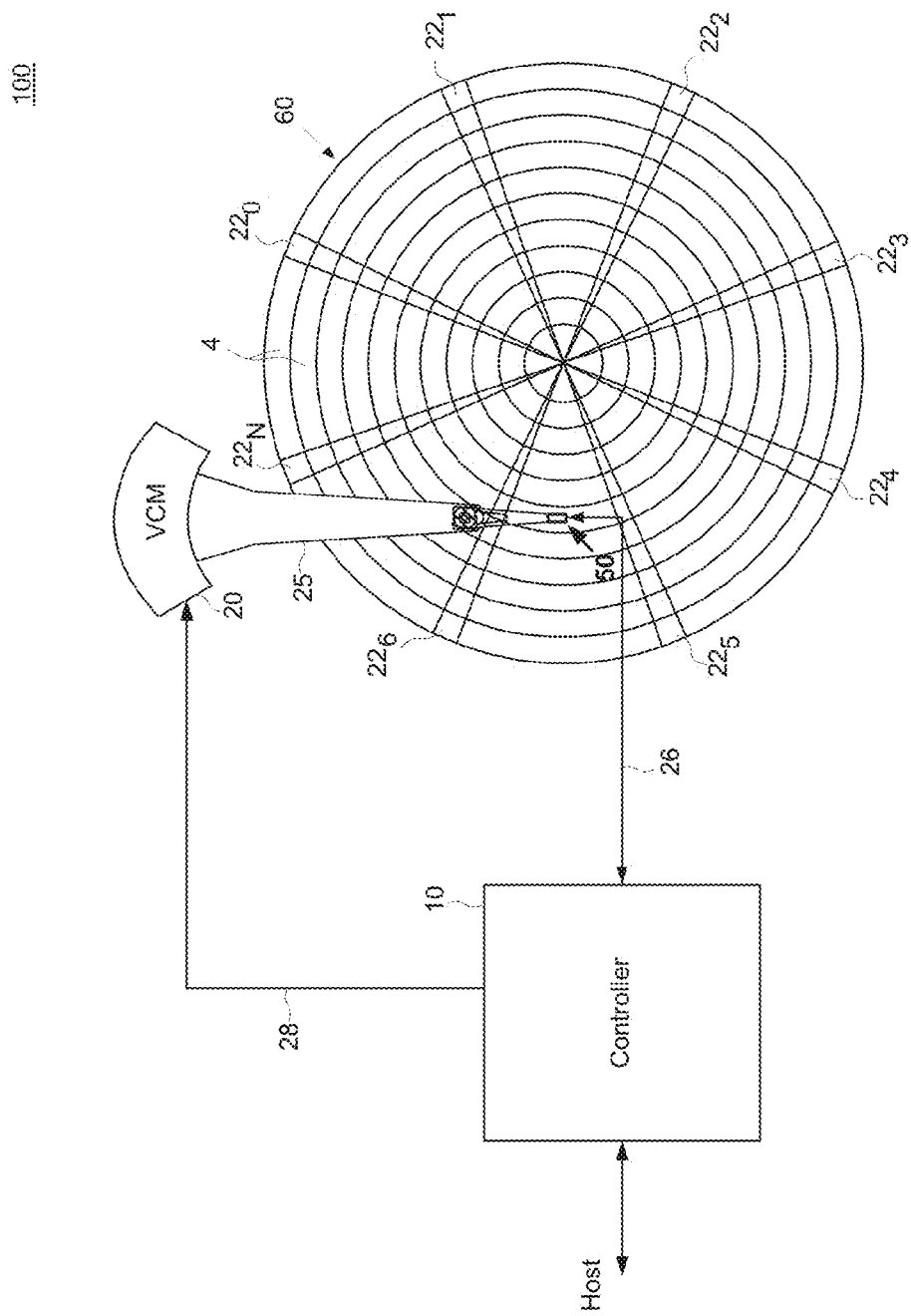
FIG. 1 is a block diagram of a disk drive according to an embodiment of the present invention.

FIG. 1 shows a disk drive 100 according to an embodiment of the present invention. The disk drive 100 comprises a rotating magnetic disk 60 and a head 50 connected to the distal end of an actuator arm 25. The actuator arm 25 is rotated about a pivot by a voice coil motor (VCM) 20 to position the head 50 radially over the disk 60. The disk drive 100 also includes a spindle motor (not shown) for rotating the disk 60 during read/write operations.

The disk drive 100 also comprises a controller 10 that performs various operations of the disk drive 100 described herein. The controller 10 may be implemented using one or more processors for executing instructions and may further include memory, such as a volatile or non-volatile memory, for storing data (e.g., data being processed) and/or instructions. The instructions may be executed by the one or more processors to perform the various functions of the controller 10 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The disk 60 comprises a number of radially spaced, concentric tracks 4. Each track 4 may be divided into a number of sectors (not shown) that are spaced circumferentially along the track 4. The sectors may be used to store user data and/or other information. The disk 60 may also comprise a plurality of angularly spaced servo wedges $22_0$-$22_N$, each of which may include embedded servo information that can be read from the disk 60 by the head 50 to determine the position of the head 50 over the disk 60. For example, the servo information in each servo wedge $22_0$-$22_N$ may include a pattern of alternating magnetic transitions (servo burst), which may be read from the disk 60 by the head 50 and processed by the controller 10 to determine the position of the head 50. The angular spacing between the servo wedges $22_0$-$22_N$ may be uniform, as shown in the example in FIG. 1.

To write data to the disk 60, the controller 10 may first position the head 50 over a desired track 4 on the disk 60. The controller 10 processes data to be written to the disk 60 into a write signal 26, which is outputted to the head 50. The head 50 converts the write signal 26 into a magnetic field that magnetizes the surface of the disk 60 based on the write signal, thereby magnetically writing the data on the disk 60.

To read data from the disk 60, the controller 10 positions the head 50 over a desired track 4 on the disk 60. The head 50 generates a read signal based on the magnetization of the disk surface under the head 50. The controller 10 receives and processes the read signal 26 into data, thereby reading the data from the disk 60.

The controller 10 may comprise a track follow controller (not shown in FIG. 1) to keep the head 50 on a desired track (e.g., during read/write operations). To do this, the controller 10 may read servo information (e.g., servo burst) each time the head 50 passes over a servo wedge $22_0$-$22_N$, process the read servo information to determine the position of the head 50, and generate a position error signal (PES) indicating the difference between the position of the head 50 and a reference position (e.g., position of desired track). The PES is then fed to the track follow controller, which outputs a control signal 28 to the VCM 20 causing the VCM 20 to move the head 50 in a direction that reduces the PES, thereby keeping the head 50 on track.

It is important for the track follow controller to keep the head 50 on a desired track during write/read operations. For example, a disturbance during a write operation can cause the head 50 to deviate from a desired track and overwrite data on an adjacent track, resulting in a loss of data.

Keeping the head 50 on track under disturbance conditions (e.g., vibrations) is a challenging problem for disk drives. As the data area density of the disk 60 continues to increase to increase the storage capacity of the disk drive 100, the tracks per inch (TPI) becomes higher. The higher TPI results in narrower tracks, which make it more difficult for the track follow controller to keep the head on track under disturbance conditions. Also, in many mobile devices (e.g., electronic music players), the disk drive 100 is mounted near speakers, which generate audio vibrations that can propagate to the disk drive 100 and move the head 50 off track.

A disk drive 100 may be tested to determine whether the disk drive 100 meets certain disturbance specifications. For example, in a convention operational vibration (op-vib) test, read/write commands may be sent to the disk drive 100 as a controlled disturbance is applied to the disk drive 100 by a shaker. The read/write performance of the disk drive 100 may be measured during the disturbance.

To qualify a disk drive 100 in a mobile device (e.g., music player), in addition to conventional op-vib specifications tested by a shaker, an audio vibration test may be conducted on the disk drive 100. The audio vibration test may involve sending read/write commands to the disk drive 100 while the device plays music at high volume on speakers in the device and measuring the read/write performance of the disk drive 100. Therefore, it is desirable for a disk drive 100 to maintain acceptable track follow performance under both conventional op-vib and audio vibration tests.

However, the frequency characterization of these tests may be very different. For example, a conventional ob-vib test typically focuses on vibration performance at frequencies below 800 Hz. An audio vibration test may test vibration performance over a wide range of frequencies from 800 Hz to 3 K Hz, depending on the songs played and the chassis on which the disk drive is mounted.

The track follow controller plays an important role in reducing the effect of external disturbances (e.g., vibrations) on the head position. However, optimizing the track follow controller to reject disturbances at certain frequencies may cause the track follow controller to amplify disturbances at other frequencies. This "water-bed" effect makes it difficult to design a single track follow controller that can effectively reject disturbances over the entire frequency range of the conventional ob-vib and audio vibration tests.

Figure 2:
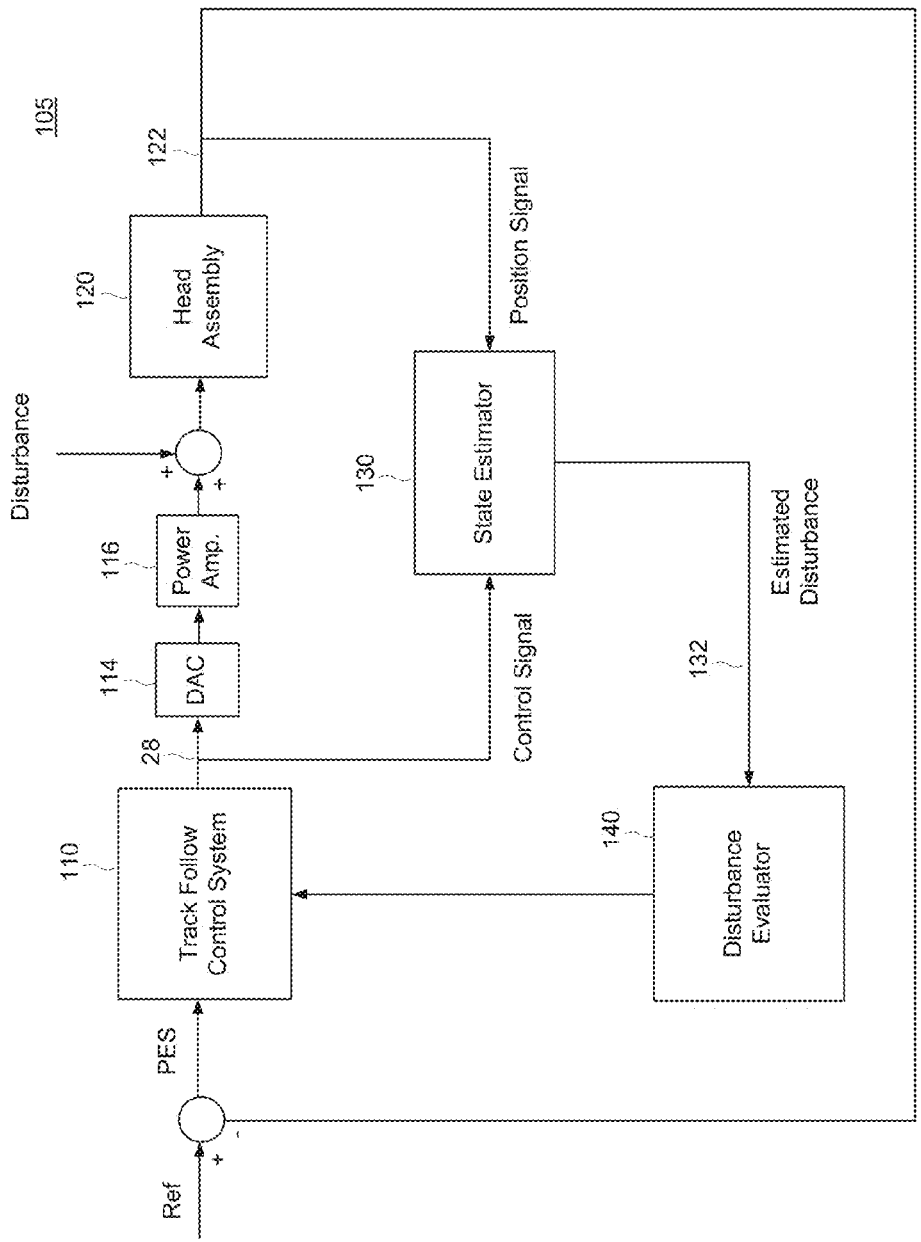
FIG. 2 is a block diagram of an adaptive control system according to an embodiment of the present invention.

FIG. 2 shows an adaptive control system 105 that addresses the above problem according to an embodiment of the invention. The adaptive control system 105 comprises an adaptive track follow control system 110, a head assembly 120, a state estimator 130 and a disturbance evaluator 140. The control system 105 may also comprise a digital to analog converter (DAC) 114 and a power amplifier 116.

The track follow control system 110 is configured to receive a positional error signal (PES) and output a control signal 28 to the head assembly 120 based on the PES to keep the head 50 on track. The track follow control system 110 may output the control signal 28 in digital form. As shown in FIG. 2, the PES may be determined by the difference between a reference position (e.g., position of desired track) and a position signal 122 indicating the position of the head 50. The position signal 122 may be generated by reading servo information (e.g., servo burst) from the disk 60 each time the head 50 passes over a servo wedge $22_0$-$22_N$ and processing the read servo information to determine the position of the head 50. The position signal 122 may in digital form with a sample period equal to the time between consecutive wedge reads.

In one embodiment, the track follow control system 110 has a plurality of selectable frequency modes, where each frequency mode may be optimized to reject disturbances within a certain frequency band. This allows the track follow control system 110 to adapt to difference disturbance conditions and provide good track follow performance under different disturbance conditions, as discussed further below.

The head assembly 120 receives the control signal 28 from the track follow control system 110 and adjusts the position of the head 50 based on the control signal 28. The head assembly 115 may comprise the VCM 20 and the actuator arm 25 shown in FIG. 1. As discussed above, the VCM 20 rotates the actuator arm 25 about a pivot based on the control signal 28, thereby moving the head 50 over the disk 60. The head assembly 115 may receive the control signal 28 after the control signal 28 has been converted into analog form by the DAC 114 and amplified by the power amplifier 116.

The state estimator 130 receives the control signal 28 from the track follow control system 110 and the position signal 122, estimates disturbance (e.g., vibrations) applied to the head assembly 120 based on the control signal 28 and the position signal 122, and outputs an estimated disturbance signal 132 based on the estimated disturbance. As shown in FIG. 2, the disturbance applied to the head assembly 120 may be modeled as a disturbance signal that is summed with the control signal and inputted to the head assembly 120. Those skilled in the art will appreciate that the disturbance signal shown in FIG. 2 models the disturbance applied to the head assembly 120, and is not intended to represent an actual signal that is summed with the control signal. The disturbance may comprise external vibrations from audio speakers or other source.

The disturbance evaluator 140 receives the estimated disturbance signal 132 from the state estimator 130 and selects one of the frequency modes of the track follow control system 110 based on the estimated disturbance signal 132. In one embodiment, the disturbance evaluator 140 may perform a frequency spectrum analysis of the estimated disturbance signal 132 (e.g., determine the energy of the estimate disturbance signal in different frequency bands) and select the frequency mode of the track follow control system 110 that is best suited to reject the disturbance based on the analysis.

Figure 3:
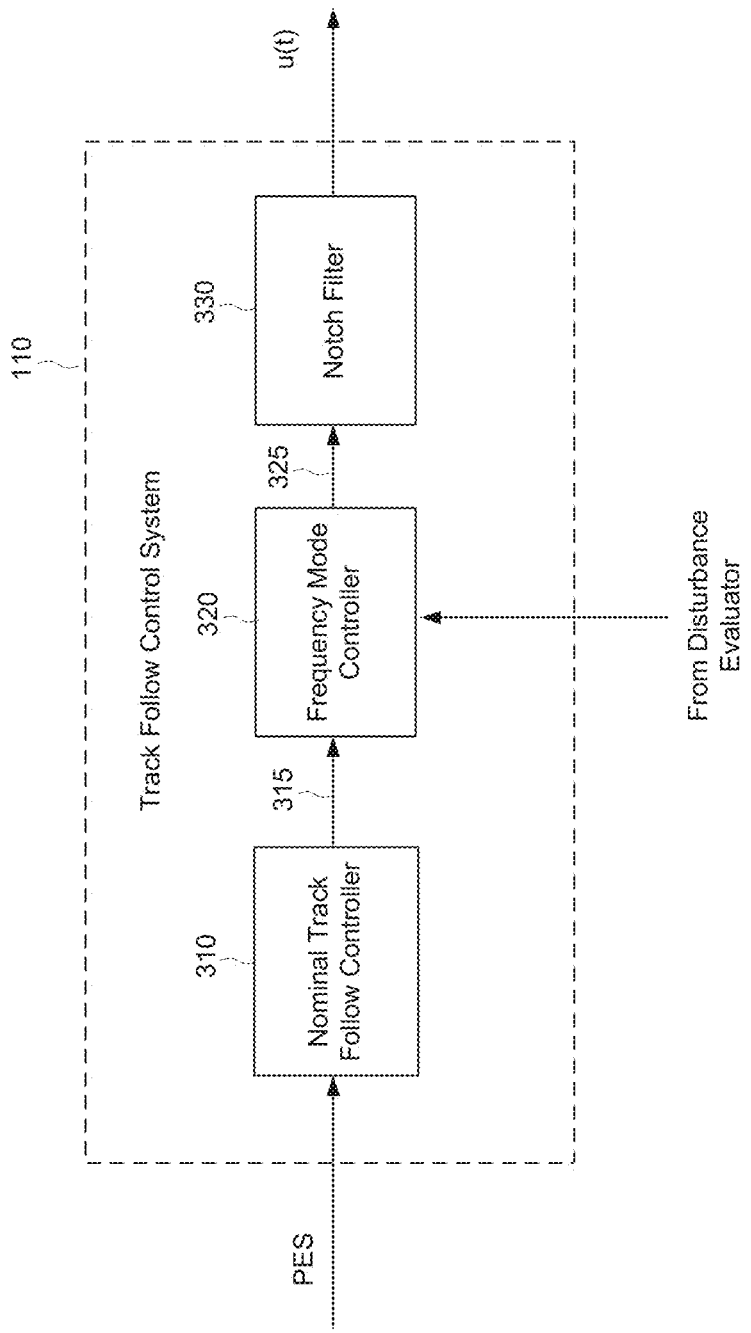
FIG. 3 is a block diagram of an adaptive track follow control system according to an embodiment of the present invention.

FIG. 3 shows the adaptive track follow control system 110 according to an embodiment of the present invention. The track follow control system 110 comprises a nominal track follow controller 310, a frequency mode controller 320 and a notch filter 330.

The nominal track follow controller 310 is configured to receive the PES and output a nominal control signal 315 to the frequency mode controller 320 based on the PES. The nominal track follow control 310 may be optimized to provide normal track following when no strong external disturbance is present.

The frequency mode controller 320 controls the frequency modes of the track follow control system 310 by filtering the nominal control signal 315 based on the selected frequency mode from the disturbance evaluator 140. In one embodiment, the frequency mode controller 310 may provide three different frequency modes: a first frequency mode optimized to reject disturbances within a first frequency band (e.g., 0 to 800 Hz), a second frequency mode optimized to reject disturbances within a second frequency band (e.g., 800 to 2000 Hz), and a third frequency mode for normal track following when no strong external disturbance is present. In this embodiment, the frequency mode controller 310 may switch the track follow control system 110 between the different frequency modes by applying different filters to the nominal control signal 315. The first frequency mode may be used under conventional op-vib conditions, and the second frequency mode may be used under audio vibration conditions. Those skilled in the art will appreciate that the track follow control system 110 is not limited to three frequency modes, and may have any number of frequency modes.

Figure 4:
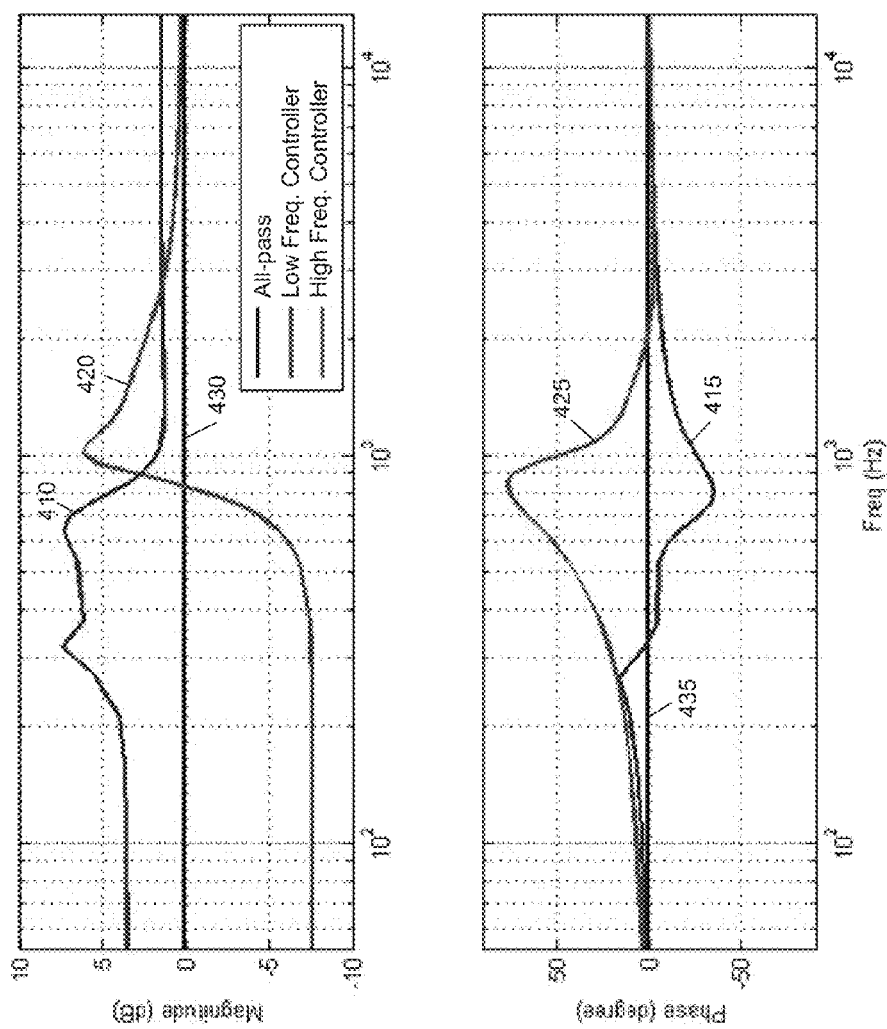
FIG. 4 shows examples of frequency profiles for filters in the adaptive track follow control system according to an embodiment of the present invention.
Figure 5:
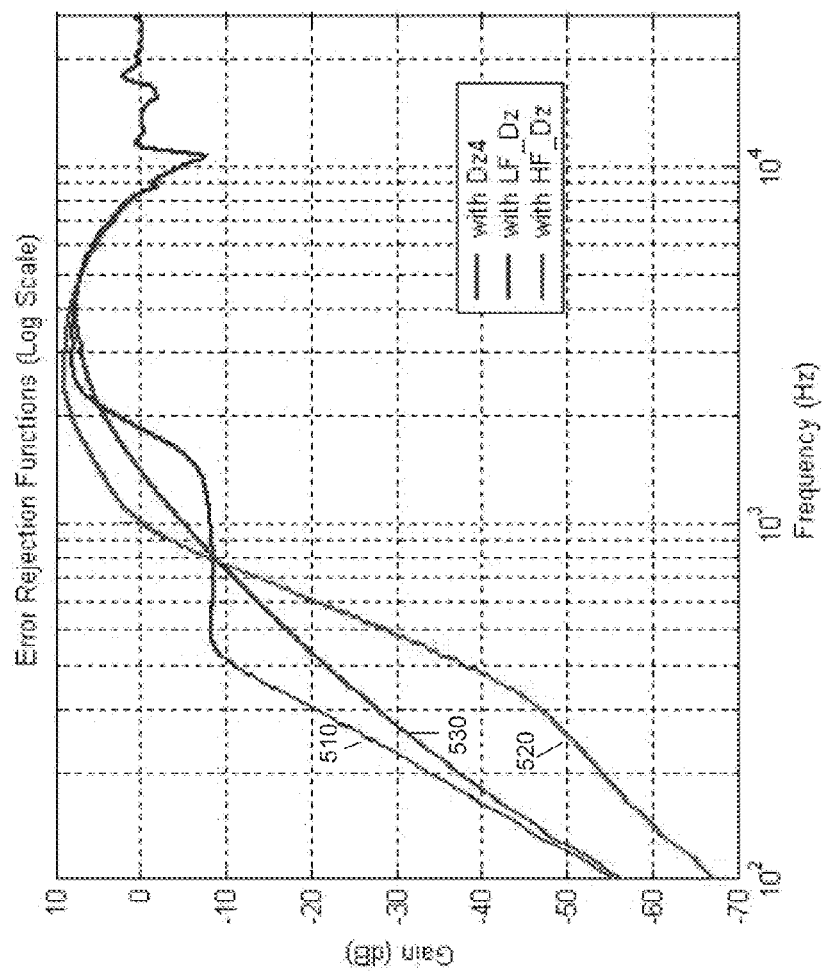
FIG. 5 shows examples of error rejection curves for different frequency modes of the adaptive track follow control system according to an embodiment of the present invention.

FIG. 4 shows an example of frequency profiles for three different filters that may applied to the nominal control signal 315 by the frequency mode controller 320. The filters include a low-pass filter 410, a high-pass filter 420 and an all-pass filter 430. As shown in FIG. 4, the low-pass filter 410 passes the nominal control signal 315 within a low frequency band and the high-pass filter 420 passes the nominal control signal 315 within a high frequency band. The low-pass filter 410 and the high-pass filter 420 may be used to implement the first frequency mode and the second frequency mode, respectively. The all-pass filter 430 passes the nominal control signal 315 at all frequencies, and may be used to implement the third frequency mode. FIG. 5 shows the phase response 415 for the low-pass filter 410, the phase response 425 for the high-pass filter 430 and the phase response 435 for the all-pass filter 430.

Thus, the combination of the nominal track follow controller 310 and the frequency mode controller 320 may be used to implement three different track follow controllers, where each track follow controller corresponds to one of the frequency modes. A first track follow controller corresponding to the first frequency mode may be implemented using a combination of the nominal track follow controller 310 and the low-pass filter of the frequency mode controller 320 to provide good track follow performance under conventional op-vib conditions. A second track follow controller corresponding to the second frequency mode may be implemented using a combination of the nominal track follow controller 310 and the high-pass filter of the frequency mode controller 320 to provide good track follow performance under audio vibrations. A third track follow controller corresponding to the third frequency mode is implemented by the nominal track follow controller 310, in which the frequency mode controller 320 passes the nominal control signal 315 at all frequencies.

The disturbance evaluator 140 can select one of the frequency track controllers based on the evaluation of the estimated disturbance signal 132. For example, the disturbance evaluation 140 may select the first track follow controller when a strong disturbance is detected in a frequency band corresponding to conventional op-vib conditions, and select the second track follow controller when a strong disturbance is detected in a frequency band corresponding to audio vibrations.

FIG. 5 shows an example of error rejection curves 510, 520 and 530 for the first, second and third track follow controllers, respectively, over a frequency range. The error rejection curve 510 for the first track follow controller shows good attenuation of disturbances between 0 and 800 Hz, and the error rejection curve 520 for the second track follow controller shows good attenuation of disturbances between 800 and 2000 Hz.

The control signal 325 outputted from the frequency mode controller 320 is filtered by the notch filter 330 to remove certain mechanical resonances from the control signal 325. The notch filter 330 may be used to prevent excitation of certain mechanical resonances in the disk drive 100 such as the bending and/or suspension modes.

Figure 6:
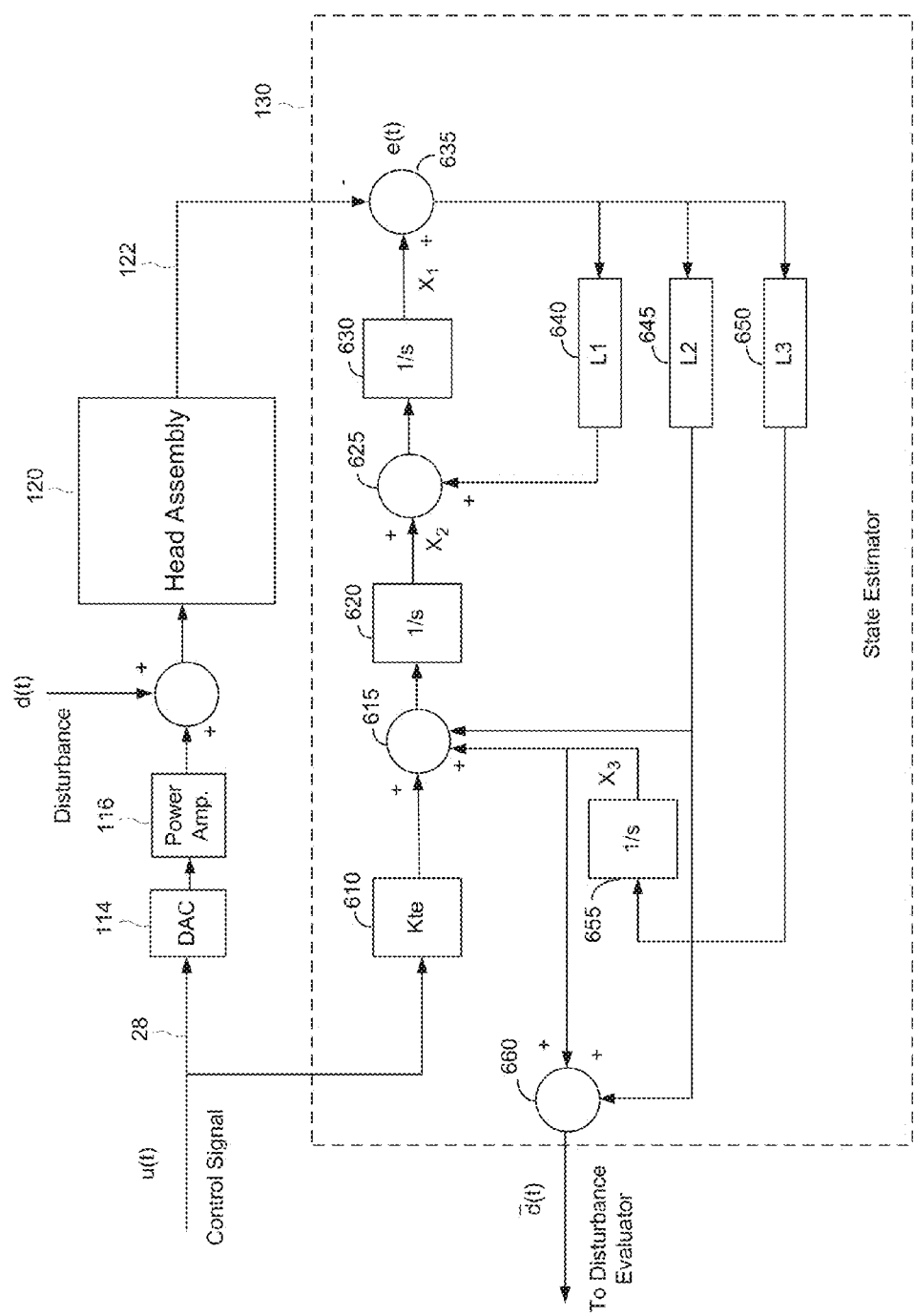
FIG. 6 is a block diagram of a state estimator according to an embodiment of the present invention.

The control signal outputted by the track follow control system 110 is denoted by u(t) in FIGS. 3 and 6.

FIG. 6 shows the state estimator 120 according to an embodiment of the present invention. The state estimator 120 comprises a Kte gain unit 610, summing nodes 615, 625 and 660, integrators 620, 630 and 655, a L1 gain unit 640, a L2 gain unit 645, a L3 gain unit 650, and an error node 635. As discussed above, the state estimator 120 receives the control signal 28 outputted by the track follow control system 110 and the position signal 122 indicating the position of the head 50, and outputs a estimated disturbance signal 132 to the disturbance evaluator 140 based on the control signal 28 and the position signal 122. The state estimator 120 may process the control signal 28 and the position signal 122 in the digital domain, in which the sample period may be equal to the time between consecutive wedge reads.

In one embodiment, the Kte gain unit 610, and integrators 620 and 630 may be used to model the head assembly 120 and other parameters affecting the position of the head 50. This model allows the state estimator 120 to estimate the head position based on the control signal 28. The value of Kte may be given by:

$$Kte = I\_max/(2^{(Dacbit-1)})*Kt/J*R*TPI \quad (1)$$

where I_max is the maximum VCM current, Dacbit is the DAC resolution, Kt is a VCM torque constant, J is a moment of inertia of the head assembly, R is a head assembly length, and TPI is the tracks per inch.

The error node 635 determines the difference between the estimate head position and the head position from the positional signal 122 and outputs an estimator error e(t). The estimator error e(t) is inputted to the L1 gain unit 640, the L2 gain unit 645 and the L3 gain unit 650, which apply estimator gains $L_1$, $L_2$ and $L_3$, respectively, to the estimator error e(t). The estimator gains $L_1$, $L_2$ and $L_3$ may comprise positive and/or negative values. The output of the L1 gain unit 640 is summed with the output of integrator 620 by summing node 625 and the output of the L2 gain unit 645 is summed with the output of the Kte gain unit 610 by summing node 615. The output of the L3 gain unit is inputted to integrator 655. The output of integrator 655 in summed with the output of the Kte gain unit 610 by summing node 615. The outputs of the L2 gain unit 645 and integrator 655 are combined by summing node 660 to generate the estimated disturbance signal 132, which provides an estimate of the disturbance denoted by $\bar{d}(t)$. The estimated disturbance $\bar{d}(t)$ is approximately zero when no external disturbance d(t) is applied to the head assembly if the model used in the state estimator 130 is accurate, which is generally the case at low frequencies.

In FIG. 6, the variables $X_1$, $X_2$ and $X_3$ represent the estimated head position, velocity and bias states, respectively. Thus, the estimated disturbance $\bar{d}(t)$ in this embodiment is given by a combination of the bias state $X_3$ and the estimator error e(t) scaled by gain $L_2$ (i.e., $\bar{d}(t) = X_3 + L_2*e(t)$). The transfer function relating the external disturbance d(t) to the estimated disturbance $\bar{d}(t)$ is given by:

$$\overline{D}(s) = X_3 + L_2 \cdot E(s) = \frac{L_2 s + L_3}{s^3 + L_1 s^2 + L_2 s + L_3} D(s) \qquad (2)$$

Figure 7:
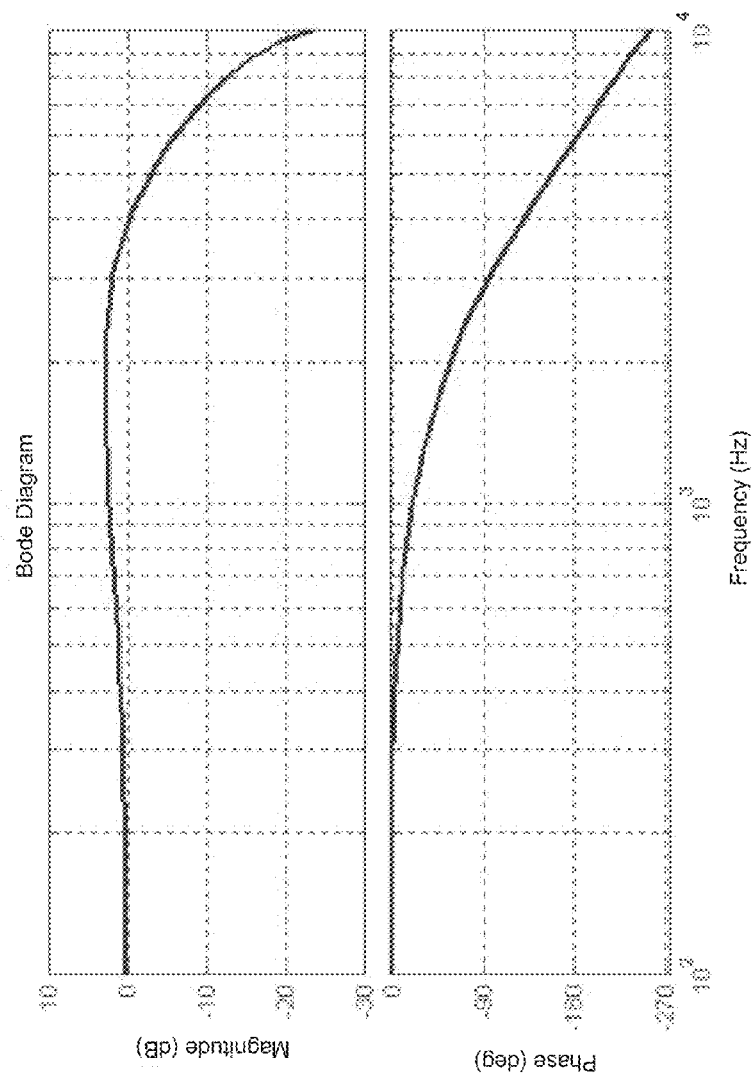
FIG. 7 shows an example of a frequency response of the state estimator according an embodiment of the present invention.

The resulting frequency response from the external vibration d(t) to the estimated disturbance $\overline{d}$(t) is a low pass filter with unity gain. FIG. 7 shows an example of the frequency response (magnitude and phase) from the external vibration d(t) to the estimated disturbance $\overline{d}$(t). The bias state $X_3$ and the gains may be adjusted to push the corner frequency of the low pass filter higher so that the frequency response from the external vibration d(t) to the estimated disturbance $\overline{d}$(t) has a relatively flat gain up to 4 K Hz, which covers the frequency range for both convention op-vib conditions and audio vibrations. As a result, the estimated disturbance $\overline{d}$(t) is independent of the frequency mode of the track follow control system 110. This allows the state estimator 130 to provide a consistent estimate of the disturbance d(t) independent of the frequency mode of the track follow control system 110.

Figure 8:
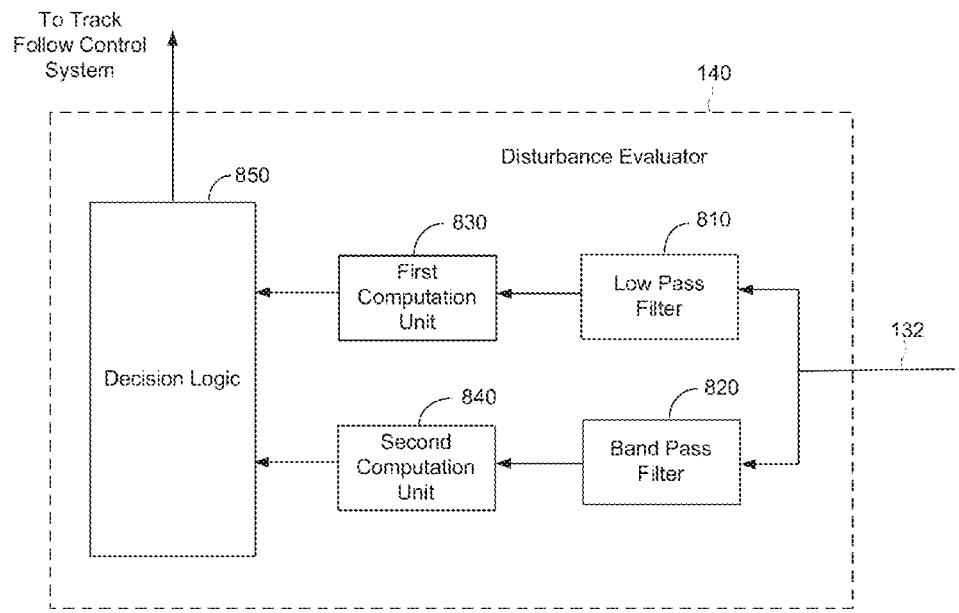
FIG. 8 is a block diagram of a disturbance evaluator according to an embodiment of the present invention.

FIG. 8 shows the disturbance evaluator 140 according to an embodiment of the present invention. The disturbance evaluator 140 receives the estimated disturbance signal 132 from the state estimator 130 and selects one of the frequency modes of the track follow control system 110 based on the estimated disturbance signal 132. The disturbance evaluator 140 comprises a low pass filter 810, a band pass filter 820, a first computation unit 830, a second computation unit 840, and decision logic 850.

Figure 9:
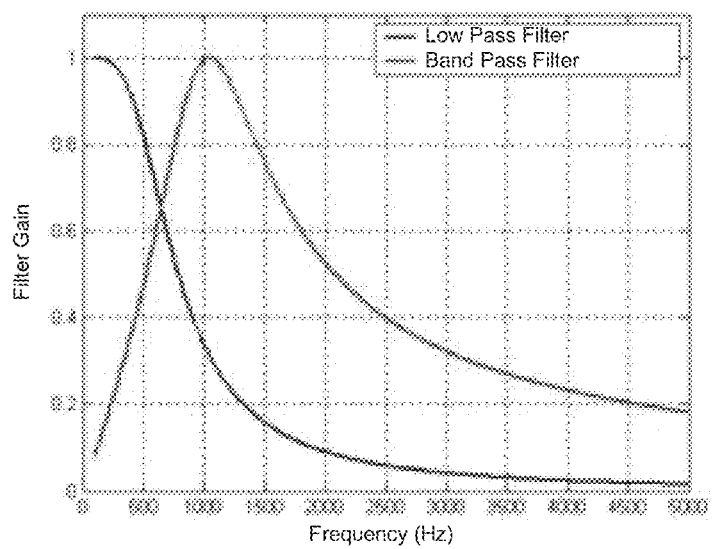
FIG. 9 shows examples of frequency profiles for filters in the disturbance evaluator according to an embodiment of the present invention.

The estimated disturbance signal 132 is passed through both filters 810 and 820. The low pass filter 810 may pass the estimated disturbance signal 132 within a first frequency band (e.g., 0 to 800 Hz) corresponding to conventional op-vib conditions. The band pass filter 820 may pass the estimated disturbance signal 132 within a second frequency band (e.g., 800 Hz to 1.5 K Hz) corresponding to audio vibrations. Examples of frequency profiles for the low pass filter 810 and the band pass filter 820 are shown in FIG. 9.

The filtered estimated disturbance signal from the low pass filter 810 is inputted to the first computation unit 830. The first computation unit 830 may compute a value based on the filtered estimated disturbance signal indicating the strength of the estimated disturbance in the first frequency band. For example, the first computation unit 830 may compute the energy of the filtered estimated disturbance signal over K samples based on the following equation:

$$E = \sum_{n=1}^{K} |d(n)|^2 \qquad (3)$$

where E is the computed energy over K samples, d(n) is the filtered disturbance signal, and n is a sample index. The sample period may be equal to the time between consequence wedge reads. The first computation unit 830 may compute other values besides energy including magnitude. The first computation unit 830 outputs the computed value to the decision logic 850.

The filtered estimated disturbance signal from band pass filter 820 is inputted to the second computation unit 840. The second computation unit 840 may compute a value based on the filtered estimated disturbance signal indicating the strength of the estimated disturbance in the second frequency band. For example, the first computation unit 830 may compute the energy of the filtered estimated disturbance signal over K samples, as discussed above for the first computation unit 830. The second computation unit 840 outputs the computed value to the decision logic 850.

The decision logic 850 receives the values from the first and second computation units 830 and 840, and selects one of the frequency modes of the track follow control system 110 based on the values. For example, the decision logic 850 may compare each value to a respective threshold and select the frequency mode based on the comparison. For the example of three frequency modes discussed above, the logic decision 850 may select the third frequency mode corresponding to the nominal track follow controller 310 when both values are below their respective thresholds. When only the value corresponding to the first frequency band (e.g., 0 to 800 Hz) is above its respective threshold, the decision logic 850 may select the first frequency mode corresponding to conventional op-vib conditions. When only the value corresponding to the second frequency band (e.g., 800 Hz to 1.5 K Hz) is above its respective threshold, the decision logic 850 may select the second frequency mode corresponding to audio vibrations. When both values are above their respective thresholds, the decision logic 850 may determine which of the values is greater and select the frequency mode corresponding to the greater value.

Although embodiments of the adaptive control system were discussed using the example of three frequency modes, those skilled in the art will appreciate that the adaptive control system may have any number of frequency modes. For example, the adaptive control system may have any number of frequency modes, in which each frequency mode is optimized for a certain frequency band. In this example, the disturbance evaluator 104 may use multiple band pass filters to determine the strength of the estimated disturbance in the different frequency bands, and select one of the frequency modes based on the determination (e.g., select the frequency mode corresponding to the frequency band with the strongest estimated disturbance). For example, the adaptive control system may have two or more frequency modes for audio vibrations, in which each of the two or more frequency modes is optimized for a certain frequency band within the frequency range for audio vibrations. The frequency bands for the different frequency modes may overlap.

Thus, the adaptive control system according to various embodiments of the present invention is able to adapt to different disturbance conditions to provide good track follow performance under different disturbance conditions. This is because the adaptive track follow controller 110 has a set of different frequency modes, where each frequency mode may be optimized to reject disturbances within a certain frequency band. The disturbance evaluator 140 performs a frequency spectrum analysis of the estimated disturbance signal 132 (e.g., determine the energy of the estimate disturbance signal in different frequency bands) and selects a frequency mode from among the set of frequency modes best suited to reject the disturbance based on the analysis. For example, if the energy of the estimated disturbance signal is high in a certain frequency band, then the disturbance evaluator 140 may select a frequency mode that is optimized to reject disturbances within that frequency band.

Figure 10:
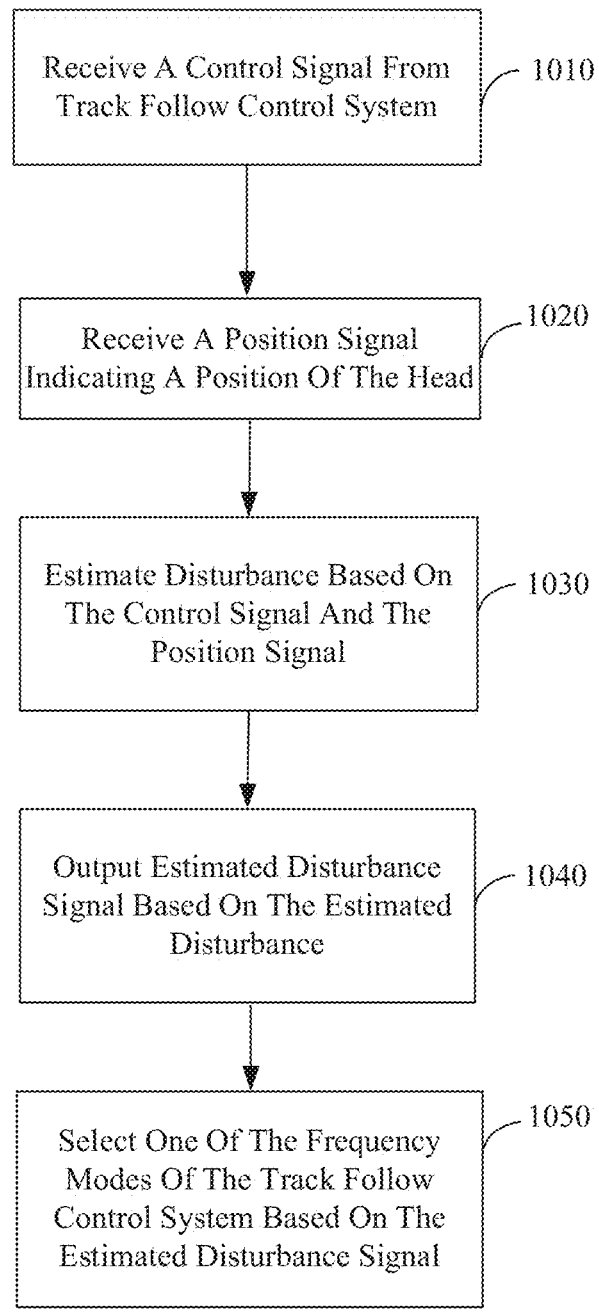
FIG. 10 is a flow diagram of a method for adaptive track following according to an embodiment of the present invention.

FIG. 10 is a flow diagram showing a method of adaptive track following in a disk drive 100 according to an embodiment of the present invention.

In step 1010, a control signal 28 is received from the track follow control system 110. The control signal 28 may also be fed to the head assembly 120 to adjust the position of the head 50 over the disk. In step 1020, a position signal 122 indicating the position of the head 50 is received. As discussed above, the position signal 122 may be generated by reading servo information (e.g., servo burst) from the disk and processing the read servo information to determine the position of the head 50.

In step 1030, disturbance is estimated based on the control signal 28 and the position signal 122. The disturbance may comprise audio vibrations or other disturbance applied to the head assembly. The disturbance may be estimated by the state estimator 130. In step 1040, an estimated disturbance signal 132 is outputted based on the estimated disturbance.

In step 1050, one of the frequency modes of the track follow control system 110 is selected based on the estimated disturbance signal 132. This may involve determining the energy of the estimated disturbance signal 132 in different frequency bands and selecting the frequency mode that is optimized to reject disturbances within the frequency band corresponding to the strongest energy.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A disk drive, comprising:
    a track follow control system having a plurality of selectable frequency modes, the track follow control system configured to receive a position error signal and to output a control signal based on the position error signal, wherein the control signal is used by a head assembly to position a head over a disk;
    a state estimator configured to receive the control signal and a position signal indicating a position of the head, to estimate a disturbance based on the control signal and the position signal, and to output an estimated disturbance signal based on the estimated disturbance; and
    a disturbance evaluator configured to receive the estimated disturbance signal, and to select one of the frequency modes of the track follow control system based on the estimated disturbance signal.

2. The disk drive of claim 1, wherein the state estimator is configured to estimate a position of the head based on the control signal, to compute an error between the estimated position of the head and the position signal, and to estimate the disturbance based on the computed error.

3. The disk drive of claim 2, wherein the state estimator is configured to estimate a bias state of the head based on the computed error and to estimate the disturbance based on the estimated bias state and the computed error.

4. The disk drive of claim 3, wherein a transfer function of the state estimator relating the estimated disturbance to the disturbance has a substantially flat gain over a frequency range of at least two kilohertz.

5. The disk drive of claim 1, wherein the estimated disturbance signal is substantially independent of the frequency modes of the track follow control system.

6. The disk drive of claim 1, wherein, in each frequency mode, the track follow control system is configured to reject disturbances within a different frequency band.

7. The disk drive of claim 1, wherein the disturbance comprises vibrations applied to the head assembly.

8. The disk drive of claim 1, wherein the disturbance evaluator comprises:
    a plurality of filters configured to pass the estimated disturbance signal within different frequency bands to obtain a plurality of filtered estimated disturbance signals; and
    a decision unit configured to receive the filtered estimated disturbance signals and to select one of the frequency modes of the track follow control system based on the filtered estimated disturbance signals.

9. The disk drive of claim 8, wherein one of the filters comprises a low pass filter and another one of the filters comprises a band pass filter.

10. The disk drive of claim 8, wherein the decision unit is configured to compute a value for each of the filtered estimated disturbance signals, and to select one of the frequency modes of the track follow control system based on the computed values for the filtered estimated disturbance signals.

11. The disk drive of claim 10, wherein each of the computed values comprises energy of the respective filtered estimated disturbance signal.

12. The disk drive of claim 10, wherein the decision unit is configured to compare each of the computed values to a respective threshold value, and to select one of the frequency modes of the track follow control system based on the comparisons.

13. The disk drive of claim 1, wherein the track follow control system comprises:
    a track follow controller configured to receive the position error signal and to output a nominal control signal based on the position error signal; and
    a frequency mode controller configured to apply different filers to the nominal control signal for the different frequency modes of the track follow control system.

14. A method for adaptive track following in a disk drive, the disk drive including a track follow control system having a plurality of selectable frequency modes, the method comprising:
    receiving a control signal from the track follow control system, wherein the control signal is used by a head assembly to position a head over a disk;
    receiving a position signal indicating a position of the head;
    estimating a disturbance based on the control signal and the position signal;
    outputting an estimated disturbance signal based on the estimated disturbance; and selecting one of the frequency modes of the track follow control system based on the estimated disturbance signal.

15. The method of claim 14, wherein the estimating the disturbance comprises:
estimating a position of the head based on the control signal;
computing an error between the estimated position of the head and the position signal; and
estimating the disturbance based on the computed error.

16. The method of claim 15, wherein the estimating the disturbance comprises:
estimating a bias state of the head based on the computed error; and
estimating the disturbance based on the estimated bias state and the computed error.

17. The method of claim 14, wherein the estimating the disturbance is substantially independent of the frequency modes of the track follow control system.

18. The method of claim 14, wherein, in each frequency mode, the track follow control system is configured to reject disturbances within a different frequency band.

19. The method of claim 14, wherein the disturbance comprises vibrations applied to the head assembly.

20. The method of claim 14, further comprising filtering the estimated disturbance signal with a plurality of filters configured to pass the estimated disturbance signal within different frequency bands to obtain a plurality of filtered estimated disturbance signals, wherein the selecting one of the frequency modes of the track follow control system is based on the filtered estimated disturbance signals.

21. The method of claim 20, further comprising computing a value for each of the filtered estimated disturbance signals, wherein the selecting one of the frequency modes of the track follow control system is based on the computed values for the filtered estimated disturbance signals.

22. The method of claim 21, wherein each of the computed values comprises energy of the respective filtered estimated disturbance signal.

23. The method of claim 21, further comprising comparing each of the computed values to a respective threshold value, wherein the selecting one of the frequency modes of the track follow control system is based on the comparisons.

* * * * *